United States Patent [19]

Bak et al.

[11] 4,137,359

[45] Jan. 30, 1979

[54] ELASTOMERS WITH IMPROVED METAL ADHESION

[75] Inventors: Eugene Bak, Polk, Pa.; Albert V. Collins, Fairview Park, Ohio

[73] Assignee: Mooney Chemicals, Inc., Cleveland, Ohio

[21] Appl. No.: 847,261

[22] Filed: Oct. 31, 1977

[51] Int. Cl.$^2$ .................... C08K 5/09; B32B 15/08; C08L 13/00

[52] U.S. Cl. .................... 428/295; 156/124; 156/334; 260/3; 260/23.5 R; 260/23.7 M; 260/45.75 R; 260/45.75 M; 260/45.75 C; 260/775; 428/462; 428/463; 428/469; 428/470; 526/47.1; 526/47.4

[58] Field of Search ............... 260/3, 23.5 R, 23.7 R, 260/23.7 M, 77.5 R, 79.5 P, 79 R, 45.75 R, 45.75 C, 45.75 M, 775; 156/124, 334, 338; 428/462, 463, 465, 469, 470, 295

[56] References Cited

U.S. PATENT DOCUMENTS

| | | | |
|---|---|---|---|
| 3,419,587 | 12/1968 | Harson | 526/4 |
| 3,514,370 | 5/1970 | Canevari | 428/462 |
| 3,897,583 | 7/1975 | Bellamy | 428/462 X |
| 3,905,997 | 9/1975 | Cowell et al. | 156/338 |
| 3,936,536 | 2/1976 | Brock | 156/124 X |
| 4,057,529 | 11/1977 | Leo et al. | 156/124 X |
| 4,082,909 | 4/1978 | Sugiyama et al. | 428/295 X |

*Primary Examiner*—Harold Ansher
*Attorney, Agent, or Firm*—Maky, Renner, Otto & Boisselle

[57] ABSTRACT

Vulcanizable elastomeric compositions are described which comprise an elastomer and from about 0.001 to about 0.1 lb mole of metal per 100 lbs of elastomer, the metal content comprising at least one metal which is an oxidizing constituent and a second metal which is a polymerizing constituent or calcium, said metals being present as (a) an organic carboxylic acid salt of two different metals combined with one or more carboxylic acids, (b) a combination of two or more different metal salts of organic carboxylic acids, or (c) a combination of a metal salt of an organic carboxylic acid and a mixed organic acid salt complex.

Such vulcanizable elastomeric compositions exhibit improved adhesion to metal surfaces and are, therefore, useful in preparing rubber laminates containing metal reinforcing elements.

29 Claims, No Drawings

ELASTOMERS WITH IMPROVED METAL ADHESION

BACKGROUND OF THE INVENTION

This invention relates to new vulcanizable elastomeric compositions, and more particularly, to a method of providing a strong and durable bond between a vulcanizable elastomeric composition and a metal surface. The invention also relates to the laminates and rubber coated metal objects thus obtained.

In the production of rubber articles, such as pneumatic tires, belts, conveyor belts which contain reinforcing metallic elements, tubes provided with reinforcing cords or wires, and, in general, in the production of all rubber articles in which the rubber is reinforced with or bonded to a metal, it is necessary to obtain a strong and durable bond between the metal and the elastomeric composition in order to insure a long life for the articles produced.

In tires, for example, maximum reinforcement of the rubber is obtained when the maximum adhesion is produced between the laminate of rubber and the reinforcing element to form a unitary structure.

Considerable research has been conducted by those involved in the rubber industry toward achieving satisfactory rubber-to-metal bonding. The search for a strong and durable bond has continued over the years in view of the increasing demands placed on steel reinforced rubber as used in automobile and truck tires because of the use of such tires at higher speeds and higher loads. Various proposals have been made in the prior art of additives for rubbers which result in improved bonding between the rubbers and metal. For example, U.S. Pat. No. 2,720,479 describes a system wherein a phenolic resin and a brominated isoolefin-polyolefin interpolymer are dissolved in a suitable liquid carrier and the resulting adhesive composition is spread on the rubber which is to be bonded to the metal. The rubber and metal are subsequently pressed together and vulcanized.

U.S. Pat. No. 3,517,722 to Endter et al describes a rubber-metal adhesion system which involves formation of a resorcinol-formaldehyde resin at the interface between the rubber and the metal, thereby bonding these materials together. Upon vulcanization, methylene and resorcinol are released and presumably react to form the resorcinol-formaldehyde resin. In U.S. Pat. Nos. 3,256,137 and 3,266,970, resorcinol-aldehyde condensation products have been suggested along with certain methylene donors to promote adhesion of rubber to textiles.

More recently, it was suggested in U.S. Pat. No. 3,847,727, that the adhesion of rubber to metal such as wire cord is improved by incorporating a halogenated quinone (e.g., chloranil) and a resorcinol-aldehyde condensate into the rubber. Another resorcinol-formaldehyde resin based additive system is described in U.S. Pat. No. 3,862,883. The adhesive system of this patent utilizes a halogen-donating material such as a halogenated hydantoin in combination with the resorcinol-formaldehyde resin.

The use of organo-nickel salts as adhesion promotors in vulcanizable elastomers is suggested in U.S. Pat. No. 3,991,130. The nickel is present in a free valent state or in a metal complex associated with an organic ligand and certain specified anions.

The use of other metal organic salts such as the metal salts of organo carboxylic acids have been suggested in several patents. For example, U.S. Pat. No. 3,897,583 suggests that the adhesion of rubber to metal is improved by incorporating a cobalt salt such as cobalt naphthenate into a rubber stock which contains an adhesive resin forming system comprising a methylene donor and a resorcinol type methylene acceptor. Japanese Pat. No. 49-17661, published May 2, 1974, describes the use of zirconium compounds such as zirconium oxide, zirconium carbonate, zirconium octylate, zirconium stearate and zirconium tall oil fatty acid salt for improving the adhesion of steel cord to rubber. In the tests reported in the Japanese patent, the zirconium compounds improved the adhesion of a vulcanizable rubber composition more than did cobalt naphthenate. Cobalt salts of organic carboxylic acids in combination with sulphur have been suggested as improving rubber to metal adhesion in U.S. Pat. No. 3,514,370.

As mentioned above, because of the increasing demands placed on the metal reinforced rubbers such as automobile tires, there continues to be a need for improved adhesion of the rubber to metal. Moreover, some of the widely used additives in rubber for promoting the cure rate of the rubbers and improving the adhesion characteristics are the cobalt salts of organic carboxylic acids such as cobalt naphthenate which are quite expensive. Accordingly, there continues to be a need for new and inexpensive rubber additives.

SUMMARY OF THE INVENTION

Vulcanizable elastomeric compositions are described which comprise an elastomer and from about 0.001 to about 0.1 lb mole of metal per 100 lbs of elastomer, the metal content comprising at least one metal which is an oxidizing constituent and a second metal which is a polymerizing constituent or calcium, said metals being present as
  (a) an organic carboxylic acid salt of two different metals combined with one or more carboxylic acids,
  (b) a combination of two or more different metal salts of organic carboxylic acids, or
  (c) a combination of a metal salt of an organic carboxylic acid and a mixed organic acid salt complex.

Such vulcanizable elastomeric compositions exhibit improved adhesion to metal surfaces and are, therefore, useful in preparing rubber laminates containing metal reinforcing elements.

DESCRIPTION OF THE PREFERRED EMBODIMENTS

It now has been found that the adhesion of rubber elastomers to metal can be improved by incorporating into a vulcanizable elastomer a small amount of mixed metal salts wherein at least one metal is an oxidizing constituent and a second metal is a polymerizing constituent or calcium. It also has been found that the improvement in the strength of the bond between the elastomer and the metal is, in most instances, better than the bond strength obtained for the corresponding elastomer wherein only one of said metals is present. Examples of the first metal which is an oxidizing constituent include cobalt, copper, manganese, and the rare earth metals such as cerium. Examples of the second metal which is a polymerizing constituent include lead, zirconium, manganese, copper and the rare earths. It is known by those skilled in the art that copper, manganese and the rare earths may function either as oxidizing or polymerizing constituents, and the property of these particular metals in the vulcanizable elastomers of the present invention will depend upon the type of other metal present. Thus, if the metal mixture is a mixture of a cobalt salt and a manganese salt, the cobalt performs the function of an oxidizing constituent and the manganese performs as a polymerizing constituent. Cobalt is the preferred oxidizing constituent.

As mentioned above, cobalt salts of organic carboxylic acids such as naphthenic acid and neodecanoic acid have been utilized as processing aids for vulcanizable elastomers and have been utilized to improve the adhesion of the elastomer to metal. However, it now has been discovered that use of mixtures of cobalt salts with other metal salts wherein the other metal is a polymerizing constituent or calcium results in improved adhesion even when the amount of cobalt salt in the elastomer is reduced, and further, even when the second salt containing a polymerizing constituent is not very effective by itself. The unexpected advantages and properties obtained when the mixed metal salts of the invention are utilized in vulcanizable elastomers to improve adhesion to metal are described more fully below and summarized particularly in Table VIII.

The oxidizing metal and the polymerizing metal or calcium can be introduced into the elastomer in accordance with this invention as either (a) an organic carboxylic acid salt of two different metals combined with one or more carboxylic acids, (b) a combination of two or more different metal salts of organic carboxylic acids, or (c) a combination of a metal salt of an organic carboxylic acid and a mixed organic acid salt complex.

The combinations identified as (b) and (c) above are preferred methods for introducing the desired metals and these combinations are described in detail below.

The organic carboxylic acid salt of two different metals (a) which may be utilized to introduce the metals into the vulcanizable elastomers of the invention may be a carboxylic acid salt obtained by reacting an organic carboxylic acid or a mixture of carboxylic acids with a first metal, and thereafter completing the reaction with the second metal. An excess of the metal or metals may be used to form overbased mixed metal carboxylates, in which the chemical equivalents of metal exceed the chemical equivalents of acid or acids present in the compositions. The essential difference between these mixed salts and the combinations of (b) and (c) is that these mixed salts are prepared by a chemical reaction rather than by the blending of reaction products.

Another example of a type of organic carboxylic acid salt of two different metals which can be utilized to improve the adhesion of elastomers to metal is the type of mixed metal-organic acid compounds containing zirconium and another metal which is an oxidizing constituent such as described in U.S. Pat. No. 3,419,587. Compounds of this type are prepared by first reacting zirconyl carbonate with a monocarboxylic acid and then reacting with one or more divalent metals in powder form or in the form of oxides, hydroxides or carbonates or, optionally, a second monocarboxylic acid. The water which is formed is removed by distillation leaving the desired product. The patentee suggests that the compounds prepared by this process can be represented by general formulas such as the following

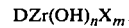

wherein D is a divalent metal; X is a carboxylic acid or a mixture of carboxylic acids; $m$ is a number from 2 to 4 and $n$ is variable but is probably not greater than 3. In Example 1 of U.S. Pat. No. 3,419,587, a composition containing 6% cobalt and 9.1% zirconium represented by the formula $CoZrPr_{2.15}V_{1.0}$ is prepared. V represents versatic acid and Pr represents propionic acid.

Example 3 of U.S. Pat. No. 3,419,587 describes the preparation of a mixed salt of versatic acid containing 6% cobalt and 9.1% zirconium represented by the formula $CoZrV_{2-1/6}$. Compounds similar to the products of Examples 1 and 3 of the patent are useful as additives for improving the adhesion of elastomers to metal. The disclosure of U.S. Pat. No. 3,419,587 which relates to the formation of mixed metal salts of carboxylic acids wherein one metal is an oxidizing constituent and a second metal is a polymerizing constituent or calcium is hereby incorporated by reference.

One of the preferred combinations of metal salts are those obtained by use of a combination of two or more different metal salts of organic carboxylic acids. In one embodiment, the salts are prepared separately and thereafter mixed in the desired proportions prior to addition to the elastomer. For example, a cobalt naphthenate dispersion in rubber processing oil, and a second dispersion containing, for example, zirconium naphthenate is prepared and the two dispersions are mixed to provide a dispersion containing the desired amounts of the two metals.

The preparation of such metal salts of organic carboxylic acids is well known to those skilled in the art since many of the salts have been used previously as processing aids for elastomers. At times, such salts have been referred to in the art as soaps. The salts or soaps can be prepared as normal or basic salts or soaps by varying the amount of metal reacted with the organic carboxylic acid and by other techniques used in the art to increase the amount of metal reacted with the carboxylic acid which results in overbased products.

The organic carboxylic acids used in the formation of the salts or soaps can be either natural or synthetic, aliphatic or aromatic acids or mixtures thereof. Examples of natural acids, although usually refined, include straight and branched chain carboxylic acids and mixtures such as tall oil acids, cyclic carboxylic acids such as naphthenic acids. A variety of synthetic carboxylic acids, and particularly aliphatic carboxylic acids or mixtures thereof have been produced, and these generally contain six or more carbon atoms.

The metal salts or soaps can be prepared by fusion, precipitation or direct metal reaction methods. The soaps normally are prepared in an inert liquid medium such as a hydrocarbon oil or solvent. The organic carboxylic acids generally will have at least six carbon atoms and as many as 30 carbon atoms but when more than one carboxylic acid is employed, as in (a), carboxylic acids containing as little as two carbon atoms may be employed as one of the acids in the mixture. Examples of useful organic carboxylic acids include acetic acid, propionic acid, butyric acid, isopentanoic acid, 2-ethyl-hexoic acid, isooctanoic acid, isononanoic acid, neodecanoic acid, tall oil acids, stearic acid, palmitic acid, naphthenic acid, etc. The preparation of the normal and basic salts of such organic carboxylic acids is known in the art such as, for example, in U.S. Pat. Nos. 2,251,798; 2,955,949; 3,723,152 and 3,941,606. The basic salts or soaps are preferred since these contain higher amounts of the active metal ingredients, and those salts and soaps containing exceedingly high metal content, often referred to as "overbased" are particularly useful in the invention.

Specific examples of metal salts of organic carboxylic acids which can be used in combinations in accordance with the present invention are listed in the following Table I.

In component examples S-1 through S-10, the diluent is a rubber process oil. Thus, where the metal salt is prepared in other diluent such as mineral spirits, the mineral spirits are stripped from the salt and replaced by the desired amount of a rubber process oil which in the specific examples is "Flexon 641".

TABLE I

Basic Carboxylate Metal Salts

| Component | Metal | Metal Content (%) | Acid |
|---|---|---|---|
| S-1 | Co | 16 | neodecanoic |
| S-2 | Co | 12 | neodecanoic |
| S-3 | Zr | 18 | neodecanoic |
| S-4 | Ce | 6 | mixture of $C_8$-$C_{13}$ |
| S-5 | Pb | 30 | napthenic |
| S-6 | Ca | 6 | mixture of $C_8$-$C_{13}$ |
| S-7 | RE* | 6 | 2-ethylhexoic |
| S-8 | Cu | 11 | mixture of $C_8$-$C_{13}$ |
| S-9 | Mn | 12 | mixture of $C_8$-$C_{13}$ |
| S-10 | Co | 32 | neodecanoic |

*Rare earth mixture-principally cerium and lanthanum

The preparation of the above described metal salts is illustrated by the following examples.

EXAMPLE S-1

A mixture of 260 parts of crude neodecanoic acid, 103 parts of propionic acid, 400 parts of mineral spirits, 160 parts of cobalt powder, 91 parts of Methyl Cellosolve, 14 parts of dipropylene glycol, 70 parts of water, 10 parts of octylphenoxy polyethoxy ethanol (Triton X-15 from Rohm & Hass Company) and 3 parts of Santoflex-77 is prepared and sparged with air while heating to a temperature of about 80° C. Reaction under these conditions continued for about 6 hours. A small amount of boric acid (7 parts) is added and the heating is continued at 80° C. with air sparging. The reaction is continued at this temperature until 180% acid neutralization is achieved (total, 14 hours). The mixture is heated for an additional 2 hours at a temperature of about 105° C. to 190% acid neutralization. The air blowing is terminated, and an inert nitrogen atmosphere is employed while the mixture is slowly heated to about 150° C. over a period of 8 hours while excess water is removed.

Four approximately equal proportions of amyl phosphate totalling 176 parts are added at 3-hour intervals while maintaining a temperature of about 145° C. and a nitrogen atmosphere. The mixture then is cooled to about 125° C., settled to remove excess cobalt and filtered.

The filtered product is transferred to a dehydration unit where it is heated under vacuum to a temperature of about 150° C. in order to remove the mineral spirits which is replaced with 303 parts of Flexon 641 oil to adjust the metal content to 16% cobalt.

The remaining component examples S-2 through S-10 in Table I can be prepared by methods similar to those described above for S-1 or by alternative procedures known in the art. In the preparation of the elastomeric compositions described below and which were utilized in the testing reported below, the carboxylate metal salt components, other than S-1 which was prepared in the manner described above, are prepared from commercially available mineral spirits solutions. The procedure involved vacuum stripping the mineral spirits followed by addition of the desired amount of a rubber processing oil or, alternatively, adding the rubber processing oil to the commercially available mineral spirits solutions followed by vacuum stripping of the mineral spirits. The mineral spirits solutions of the metal salts are available from Mooney Chemicals, Inc., Cleveland, Ohio, 44113 under the general trade designations TEN-CEM, CEM-ALL, NAP-ALL, HEX-CEM, LIN-ALL, and NEO-NAP. In mineral spirits, these products are identified as driers.

As another example of the carboxylate metal salts in rubber processing oils listed in Table I, component S-3 is prepared from Mooney TEN-CEM drier based on neodecanoic acid and containing 12% zirconium. A 12% zirconium solution in mineral spirits (13.28 parts) is mixed with 2.5 parts of Flexon 641 oil and the mixture is heated under vacuum to remove the mineral spirits. The residue is adjusted with additional processing oil to form component S-3 containing 18% zirconium. As mentioned, other carboxylate metal salts in rubber processing oils such as those listed in Table I can be prepared from the corresponding mineral spirit solutions in a similar manner.

Mixtures of basic carboxylate metal salts such as those described in Table I are easily prepared and utilized in accordance with the invention. For example, a mixture in accordance with the invention is prepared from equal parts of components S-1 and S-3 resulting in a mixture containing 8% cobalt and 9% zirconium. A mixture of two parts of component S-1 with one part of component S-3 will contain 10.7% of cobalt and 6% of zirconium. Various metal ratios of the oxidizing constituent to the polymerizing constituent can be incorporated into the vulcanizable elastomers of the invention. Generally, the percent weight ratio of oxidizing metal to polymerizing metal will be in the range of from 10:1 to about 1:10 with the preferred embodiments being from about 3:1 to about 1:3. Examples of metal mixtures which can be incorporated into vulcanizable elastomers is salts of organic carboxylic acids in accordance with the invention include combinations of cobalt:zirconium; cobalt:cerium, cobalt:lead, cobalt:rare earth mixture; cobalt:copper; cobalt:manganese; copper:zirconium; and cobalt:calcium. These metal salt combinations are included in vulcanizable elastomeric compositions in amounts which are sufficient to improve the adhesion of the vulcanized elastomer to metal, and generally, amounts within a range of from about 0.001 to about 0.1 lb mole metal per 100 lbs of elastomer will be sufficient.

MIXED ORGANIC ACIDS SALT COMPLEXES

The elastomers of the invention can contain mixed organic acid salt complexes which are overbased metal carboxylate/sulfonate complexes. The complexes have a metal-to-acid ratio of greater than 1:1, are soluble in aromatic and hydrocarbon solvents, especially mineral spirits and light oils, and are easily dispersed in vulcanizable elastomers despite the very high transition metal content.

These complexes characteristically include, in chemical combination with at least one transitional metal, at least two different organic acid moieties selected from unsaturated and, with some metals to avoid unwanted side reactions preferably saturated, aliphatic or alicyclic monocarboxylic acids and oil-soluble sulfonic acids. At least a first acid is a monocarboxylic acid moiety, preferably a monobasic aliphatic carboxylic acid containing at least seven carbon atoms. Although there is no critical upper limit on the number of carbon atoms, about 22 carbon atoms is a practical upper limit.

There is no carbon chain restriction on the second acid except that when the second acid is a carboxylic acid, the number of carbon atoms in the longest carbon chain in the second carboxylic acid should differ from the total number of carbons in the first acid by at least two carbon atoms. There is no restriction in carbon chain length imposed on any third organic acid employed as a ligand, nor on any additional acids thus employed. While one or more of the acids may be volatile low molecular weight types, combinations of non-volatile acids which follow the above rules also may be employed.

The compositions appear from molecular weight determinations to be polymers, which may be designated as metal oxide- or hydrous metal oxide-oxy acylate (i.e., -carboxylate) or -sulfonate complexes, or where moieties of aliphatic ether alcohols are included in the compositions, as metal oxide or hydrous metal oxide-carboxylate-alkoxide complexes. The complexes appear to be higher in molecular weight than the prior art soaps of the same metals.

More particularly, from X-ray diffraction study of solids and solutions, and electron diffraction and microscopy study of solids, it appears that, in solid, solvent-free compositions of the invention, the ultimate particles each comprise a metallo-oxy or metallo-oxyhydroxy crystallite core, surrounded by an amorphous matrix of organic ligand groups including bound groups attached through ionic and hydrogen bonding to the atoms of the core crystallite especially at its surface, and absorbed unbound organic groups. These complexes may also be termed heterogeneous in respect to such crystalline and non-crystalline structure within the ultimate particles, and as well with respect to the matrix, inasmuch as different organic moieties may be involved.

The particle size distribution peak is relatively narrow. For a particular choice of metal and acids, variation in the metal to acid ratio seems generally to change the proportion of crystallite-cored particles, rather than their size.

The crystal core phases have been found to be $Mn_3O_4$ (spinel), $CoO$ (cubic), $Fe_3O_4$ (spinel) and $CuO$ (triclinic) for specimens containing respectively only manganese, cobalt, iron and copper. Where two distinct metals were used for the preparations, even with the second being non-transitional, atoms of the second were also found to be present in the core. When, for example, a cobalt source was included with a manganese source in what would be otherwise normally a preparation of a manganese complex with a spinel type core, the cobalt appeared to replace part of the four-fold coordinated manganese in the spinel arrangement.

It may be here observed that when the transitional metal source is to be an oxide, the core crystalline phase contains a metal oxide portion in which the metal valence is higher than the source oxide.

When only carboxylic acids or carboxylic acid moiety sources (acids, esters) are used in the preparation, it is believed that the organic moiety or ligand species is present as a soap-like metal carboxylate-hydroxide component, $R—CO_2—M—OH$, where the R group is a carbon chain from the acid and M is the transition metal. Such components engender soap-like characteristics in these compositions. From infrared investigations, it appears that the organic moiety attachment occurs especially through hydrogen bonding between the hydroxyl on the organic moiety and oxygen atoms on the surface of the crystal core, though ionic bonding to the core atoms appears also to occur. An absorption type equilibrium is established between the core with bound organic species and the unbound organic species which are associated with the core.

The amorphous character of the matrix, resulting from the dissimilarity of the acid moieties, confers high solubility in aromatic and aliphatic hydrocarbons (respectively, e.g., xylene, mineral spirits), and for some compositions, to the extent of solution metal contents exceeding 50% by weight.

Each individual crystallite, considered for simplicity of discussion as a cube, is about 50 to 100Å on a side. The crystal unit cell is approximately 10Å on a side, and contains about 20 metal oxide or metal hydroxide molecules. The specific number of molecules, specific unit cell size, and crystal composition depends on the particular metal in question. Thus one manganese type crystal with a 100Å edge may contain about 1,000 unit cells or 20,000 metal molecules, or with a 50Å edge, about 125 unit cells or 2,500 metal molecules. The crystal face in a 100Å edge core may contain about 600 active sites for organic moiety attachment by hydrogen bonding, which may contribute to the complex's unusual stability.

The solvent-free or solid complex compositions of the individual metals, manganese, cobalt, iron and copper and mixed metals (e.g., manganese-cobalt, manganese-zinc, manganese-barium) are found to have an ultimate particle size of about 50 to 100Å on the edge with a minimum average molecular weight of about $10^4$. On the other hand, molecular weight determinations by vapor pressure or freezing point depression methods and gel permeation chromatography indicate the apparent molecular weights are considerably smaller in many of the solvents used, (e.g., in carbon tetrachloride, the molecular weights are from about 500 to 1,000). This difference may be explained by the fact that the number of large weight particles (comprising crystallite cores with retained bound organic moieties) is far outnumbered by the unbound organic moiety fragments which become dissociated in solution from their respective original cored particles.

Moreover, amorphous aggregates of crystalline-cored particles arise due to the affinity of one complex particle for another. A typical aggregate or cluster size, of 200–500Å on a side varying for different metals, may represent a cluster of up to about 250 individual crystals. In solution, the aggregate size on the one hand, or the degree of dissociation on the other, is a function of the solvent, the temperature, and the solution concentration.

The degree of association of these complexes thus varies in different solvents such as carbon tetrachloride, benzene, trichlorobenzene and cyclohexane. In dissociating solvents, such as carbon tetrachloride, the degree of association in comparison to prior art metal soaps averages about five. In any solvent, a near integral multiple value is usually encountered.

A typical crystal of these metal complexes may be represented by the formula,

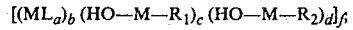

wherein
- M is a metal atom with valence greater than one, is a transitional metal in the majority of metal occurrences in the composition, and each M may represent different metals;
- L is an oxygen or a hydroxyl group;
- $R_1$ is an organic carboxylate group;
- $R_2$ is an organic carboxylate or sulfonate group;
- $a$ is from about 1 to 2;
- $b$ is greater than 1;
- $c$ and $d$ are each greater than zero, and $c + d$ is at least 3; and
- $f$ is at least 1.

Ether alcohols or polyols may be used in addition to the acid sources or in place of a part of the $R_2$-containing ligand.

To prepare the overbased metal complexes, a reaction is initiated with heating if necessary between a previously formed, or formed-in-situ, divalent transitional metal carboxylate and a predetermined excess of divalent transitional metal hydroxide formed-in-situ from the metal or its lower oxide in the presence of an oxygen-supplying material such as air. Usually mineral spirits is a convenient diluent or reaction medium. The reaction end point is reached when the soluble metal content of the reaction mass reaches a maximum. Generally there will be little or no unreacted residues at this stage if the reactant amounts are carefully formulated, but any unreacted metallic residues can be removed by filtration.

For elastomer applications, the diluent or reaction medium is removed by distillation or otherwise, and the reaction product is dispersed in rubber processing oils which are well known to those skilled in the elastomer art to provide the desired metal concentrations and ease of handling.

The metal contained in these complexes must be at least in part a transition metal. When the complexes contain additional metals, any desirable metal can be utilized such as calcium, barium, zinc, etc. Of the transitional metals, those elements found in the first transition series, namely, scandium, titanium, vanadium, chromium, manganese, iron, cobalt and nickel, are preferred.

Although specific details will vary, each transition metal complex is prepared according to the same general method irrespective of the metals and acids employed. When a metal oxide such as manganese oxide is used, it is slurried with water and with what by ordinary stoichiometric considerations would be a deficiency of organic acids at a selected mole ratio of metal-to-acid. The slurry is agitated and heated under reflux until no further reaction occurs and the "excess" metal oxide has been completely converted to hydroxide. Air is then introduced into the mix which is heated to about 120° C. to 150° C. until substantially all of the water is eliminated and insoluble manganous hydroxide has been solubilized by conversion into the complex. Appearance and metal content analyses indicate when processing can be terminated.

If manganese metal is employed rather than manganese oxide, some air may be introduced to facilitate the formation of manganous oxide or hydroxide, but under some control to avoid too large an excess of the oxide or hydroxide which would result in formation of some insoluble higher oxides together with manganese hydroxide.

A similar process is used with cobalt or iron powders. Either copper metal or cuprous oxide may be employed to form the copper complex, but in both instances, air is required for oxidation.

The mole ratio of total metal or metals to total acids which characterizes specific complexes can be found by determining the metal content of the complex and comparing it stoichiometrically to the quantity of reactant acids used in the synthesis of the complex. The metal content can be determined by complexometric titration procedures or other conventional methods.

Various mixtures of formulations of reactant monobasic organic acids may be used to facilitate processing or for collateral reasons. Examples of organic carboxylic acids useful in the invention include propionic acid, butyric acid, 2-ethoxyhexoic acid, commercially available standardized nonanoic acid, neodecanoic acid, oleic acid, stearic acid, naphthenic acid and tall oil acid, and as well other natural and synthetic acids and acid mixtures.

The sulfonic acids include the aliphatic and the aromatic sulfonic acids. They are illustrated by petroleum sulfonic acids or the acids obtained by treating an alkylated aromatic hydrocarbon with a sulfonating agent, e.g., chlorosulfonic acid, sulfur trioxide, oleum, sulfuric acid, or sulfur dioxide and chlorine. The sulfonic acids obtained by sulfonating alkylated benzenes, naphthylenes, phenol, phenol sulfide, or diphenyl oxide are especially useful.

Specific examples of the sulfonic acids are dodecylbenzene sulfonic acid, didodecylbenzene sulfonic acid, dinonylbenzene sulfonic acid, octadecyl-diphenyl ether sulfonic acid, bis-cetylphenyl disulfide sulfonic acid, cetoxy-capryl-benzene sulfonic acid, dilauryl beta-naphthalene sulfonic acid, the sulfonic acid derived by the treatment of polyisobutene having a molecular weight of 1500 with chlorosulfonic acid, paraffin wax sulfonic acid, cetyl-cyclopentane sulfonic acid, lauryl-cyclohexane sulfonic acid, and polyethylene (molecular weight of 750) sulfonic acid, etc.

In the initial reaction batch, other materials may be used for various ancillary purposes, for example, to serve as dispersing agents or to produce dispersing agents for other reactants. Hydrazine can be included to reduce especially any manganese initially present in higher than the manganous state. Polyols or alkoxyalkanols can be added as promoters or to reduce the viscosity of the reaction mixture. Acids such as formic, acetic or hydrochloric acid can be included as promoters.

There may be employed according to conventional practice, viscosity modifiers such as glycols, alcohol ethers or glycol ethers, amines and phosphate esters, but higher metal-to-acid ratios may be attained with use of alcohol- or glycol-ethers. Also anti-oxidants may be employed if desired.

Some ancillary constituents may react and combine with the metal, but the net effect is not deleterious to the process or ultimate product. For example, alkoxyalkanols of higher molecular weight and boiling ranges may become a combined organic moiety in a final product.

Several examples of the mixed organic acid salt complexes are presented below in tabular listings giving for each example: (a) the raw materials and amounts used, (b) for the solution product usually brough to 1,000 gram final batch weight, (i) the weight percent metal content after removal of any unreacted or insoluble metal or oxide, (ii) the total metal-to-total acid molar ratio ("M/A"), (iii) the weight percent conversion of the metal available in the source, and in some examples, (iv) other properties such as percent by weight of non-volatile material ("non-volatiles" or "N.V.") which is the presumed active complex in the solution product; and (c) for the "active component", that is the solid obtained upon removing the diluent or solvent, the metal content by weight percent.

The percentages referred to in the tables and elsewhere are weight percentages, unless otherwise stated. The molar ratio and conversion values are equally pertinent or applicable to the solution product and to the isolated active component, which is found to have a complex constitution, of the nature previously described.

For the raw material under each example heading, in column "Bt" there are given for each batch component the amount used in grams for a thousand grams of the batch solution product obtained with the designated metal content; and, for certain components in the column "Mols" or "Eq", respectively the gram-mols, or the gramequivalent based upon apparent molecular weight, as given by chemical analysis. Thus the amounts stated represent the active content of the designated components or, in the case of the "principal" organic acids which are technical or standardized mixtures, the gram-mol or grams-equivalent figure is based upon the determined acid number for the nominal raw material acid.

For ammonium hydroxide, hydrochloric acid and hydrazine hydrate, the amounts stated are weights used respectively of the usual concentrated ammonia, 37% acid and 35% hydrazine water solutions. The mineral spirits used have a boiling range of about 149° to 205° C. The amounts of air given in cubic feet (taken at ambient conditions, without reduction to standard or dry conditions) are the total amounts blown by the time of oxidation completion.

MANGANESE COMPLEXES

The manganese salt complexes generally are prepared as follows.

A mixture of manganese metal, or any acid-soluble divalent manganese compound, but preferably manganous oxide, water and the selected acids in mineral spirits or other diluent medium, is agitated in preferably an inert atmosphere such as nitrogen with heating as required until completion of a first stage reaction resulting in a homogeneous, opaque, light tan, viscous, usually paste-like product or intermediate. The first stage reaction intermediate or product is oxidized with heating by introducing gaseous oxygen, for example, by air blowing.

Though the dehydration may also be carried on during the foregoing steps, preferably the first stage product is itself substantially dehydrated before oxidation, usually by heating above 100° C., with the nitrogen gas blanket being maintained.

The progress of the first stage reaction is followed by some form of analytic control with periodic sampling of the batch. For example, a sample of the reaction mixture can be centrifuged or filtered and the color of the lighter precipitate examined for the color of residual greenish manganous oxide or black manganese metal powder. Actual chemical analysis of the liquid (supernatant in the centrifuge tube or the filtrate) for dissolved manganese until a constant maximum of manganese content in successive samples also indicates substantial completion of the first stage reaction.

The batch temperature then is raised to about 140° C. or higher and air is bubbled into the reaction mass. In some instances the air is pre-heated to about 150° C. It is observed that, after the first stage reaction is completed, the air blowing for the second stage may be begun without first completing intermediate product dehydration. The batch temperature is raised at the same time so that dehydration and oxidation proceeds together. During this oxidation, the viscosity of the batch and its turbid opacity are reduced progressively to result ultimately in a dark brown transparent reaction product solution form.

The second stage blowing is continued with heating until therre is substantially no further water or immiscible phase being distilled over into the separator, and until the reaction batch reaches the uniform dark brown or the manganese content becomes constant in the filtrate of periodically taken batch samples. Due to impurities of the reactants, or compromise with optimum process conditions, the crude liquid product may require clarification as by filtration while hot, with a filter aid.

The liquid product is advantageously vacuum distilled to a higher concentration. Of course, where it is known that filtration of the resultant concentrated solution will not be unacceptably slowed down, solvent may be distilled from the reaction vessel. Moreover, it is generally possible, by expelling all solvent and other volatile constituents or components of the batch product to obtain a substantially anhydrous, usually brittle, solid form. Products have been thus obtained with manganese contents in excess of 60%.

Process-wise with respect to manganese, it is important that an appreciable amount of water be present during the first stage, especially with metallic manganese as the manganese source.

Broadly, it may be stated that at atmospheric pressure, the first reaction stage, for which in practical sense the presence of water is required, is to be conducted below 100° C., and the second stage above 100° C. as a condition favorable not only for the air oxidation reaction but also for removal of water and excess solvents. More specifically temperature ranges of about 60°–120° C. have been found useful for the first stage and temperatures from about 100° to about 160° C. for the second stage.

TABLE II

| | MANGANESE COMPLEXES | | | | | | | | | |
|---|---|---|---|---|---|---|---|---|---|---|
| | Ex. C-1 | | Ex. C-2 | | Ex. C-3 | | Ex. C-4 | | Ex. C-5 | |
| Raw Materials | Bt. | Moles | Bt. | Moles | Bt | Moles | Bt. | Moles | Bt. | Moles |
| 2-Ethylhexoic Acid | 0 | — | 0 | — | 0 | — | 0 | — | 0 | — |
| Neodecanoic Acid | 117 | 0.62 | 117 | 0.62 | 61 | 0.35 | 71 | 0.38 | 162 | 0.87 |
| Propionic Acid | 23 | 0.31 | 23 | 0.31 | 28 | 0.38 | 17 | 0.23 | 63 | 0.85 |
| Dodecylbenzene Sulfonic Acid | 0 | — | 0 | — | 0 | — | | | 39 | 0.12 |
| Stearic Acid | 89 | 0.32 | 89 | 0.32 | 42 | 0.15 | 45 | 0.16 | 16 | 0.06 |
| Tall Oil FA | | | | | | | | | | |
| Tall Oil | | | | | | | | | | |
| Total Organic Acids | 229 | 1.25 | 229 | 1.25 | 131 | 0.88 | 132 | 0.77 | 280 | 1.90 |

TABLE II-continued

| | MANGANESE COMPLEXES | | | | | | | | | |
|---|---|---|---|---|---|---|---|---|---|---|
| | Ex. C-1 | | Ex. C-2 | | Ex. C-3 | | Ex. C-4 | | Ex. C-5 | |
| Raw Materials | Bt. | Moles | Bt. | Moles | Bt | Moles | Bt. | Moles | Bt. | Moles |
| Cellosolve | 0 | — | 0 | — | 0 | — | 300 | — | 0 | — |
| Hydrochloric Acid | 0 | — | 5 | — | 8 | — | 8 | — | 0 | — |
| Mineral Spirits | 392 | — | 369 | — | 516 | — | 394 | — | 414 | — |
| Water | 165 | — | 165 | — | 188 | — | 199 | — | 193 | — |
| 35% Hydrazine | 0 | — | 2.1 | — | 12 | — | 13 | — | 11 | — |
| Manganous Oxide | 531 | 7.44 | 531 | 7.44 | 602 | 8.44 | 639 | 8.95 | — | — |
| Manganese Powder | — | — | — | — | — | — | — | — | 473 | 8.6 |
| Air-Total Cu. Ft. | 7.1 | | 5.9 | | 6.4 | | 7.6 | | 6.2 | |
| Product | | | | | | | | | | |
| % Mn | 39.40 | | 40.30 | | 44.70 | | 48.90 | | 40 | |
| M/A Ratio (molar) | 5.73 | | 5.86 | | 9.25 | | 11.55 | | 3.83 | |
| Mn Conversion % | 96.50 | | 98.50 | | 96.00 | | 99.20 | | 85 | |
| % Non-Volatile Active Component | 77.50 | | 79.20 | | 76.70 | | 79.70 | | 77.4 | |
| % Mn | 50.80 | | 50.80 | | 58.20 | | 61.30 | | 51.7 | |

TABLE III

| | MANGANESE COMPLEXES | | | | | |
|---|---|---|---|---|---|---|
| | Ex. C-6 | | Ex. C-7 | | Ex. C-8 | |
| Raw Materials | Bt. | Moles | Bt. | Moles | Bt. | Moles |
| Neodecanoic Acid | 50 | 0.348 | 41 | 0.225 | 57 | 0.313 |
| Propionic Acid | 34 | 0.181 | — | — | 38 | 0.514 |
| Stearic Acid | 13 | 0.137 | 64 | 0.225 | 58 | 0.204 |
| Butyric Acid | 0 | — | 27 | 0.300 | — | — |
| Other Organic Acids | 51 | 0.181 | — | — | — | — |
| Total Organic Acids | — | 0.847 | — | 0.750 | 153 | 1.031 |
| Cellosolve | — | — | 180 | 2.000 | — | — |
| Hydrochloric Acid | — | — | — | — | 8 | — |
| Mineral Spirits | 568 | — | 1,200 | — | 1,100 | — |
| Water | — | — | 210 | — | 200 | — |
| 35% Hydrazine | 7 | — | 4.80 | — | 13 | — |
| Manganese Oxide | 560 | — | 642 | 9.060 | 642 | 9.060 |
| Air-Total Cu. Ft. | 32 | — | 7.70 | — | Yes | — |
| Product | | | | | | |
| % Mn | 40 | | 40.30 | | 40.10 | |
| M/A Ratio - Moles | 8.6 | | 12.10 | | 8.80 | |
| Mn Conversion % | 92.7 | | — | | — | |
| % Non-Volatile Active Component | — | | 67.40 | | — | |
| % Mn | — | | 59.80 | | 59.20 | |

In the manganese examples of Tables II and III, the process is usually carried out under refluxing conditions in the first stage until dehydration or water removal begins. In the second stage, water or other condensates immiscible with mineral spirits is removed. The batch heating is and generally can be begun as materials are added. Where used, the hydrazine (hydrate) and hydrochloric acid are added mainly after the manganese source.

For the first stage in these examples, the times required are about 4½ to 5½ hours at a temperature below 100° C., followed by a period of about 2 to 4 hours at about 100° C. to dehydrate before air introduction.

For the second or oxidation stage, 4 to 5 hours of air blowing is required in these Examples C-1 through C-4 at 129° to 142° C., but in Example C-5 about 7¾ hours of which 5½ hours is between 131° and 146° C. and 2 hours between 110°–128° C.

By freezing point depressions of non-associative solvents such as carbon tetrachloride, the average molecular weight for these manganese complexes typically appears to be 900 ± 100, about five times that of analogous soaps.

Also by freezing point depression by the manganese compositions in associative solvents such as benzene and cyclohexane, the average molecular weight is about 15,000 to 20,000. By gel permeation chromatography in tetrahydrofuran, the average molecular weight of the manganese complexes is on an order greater than $10^4$, and in carbon tetrachloride, the "molecule" size is about from 100 to 1,000Å. The largest fragment derived by heating for mass spectrum measurements represents a molecular weight of about 1,000. Vapor pressure depression measurements in carbon tetrachloride give average molecular weights of 6910 ± 690.

OTHER METAL COMPLEXES

Using at least two different acids and with air blowing for oxidation, highly overbased compositions are prepared with other metals using similar apparatus, but with some modifications of method. The details of these examples are summarized in Tables IV and IVa.

TABLE IV

| | Ex. C-9 | | Ex. C-10 | | Ex. C-11 | |
|---|---|---|---|---|---|---|
| Raw Material | Bt. | Moles | Bt. | Moles | Bt. | Moles |
| 2-Ethylhexoic Acid | — | — | — | — | 185 | 1.275 |
| Neodecanoic Acid | 108 | 0.60 | 180 | 1.00 | — | — |
| Propionic Acid | 56 | 0.75 | 60 | 0.80 | — | — |
| Stearic Acid | 43 | 0.15 | 58 | 0.20 | 64 | 0.225 |
| Butyric Acid | — | — | — | — | — | — |
| Amyl Ac. Phosphate | — | — | — | — | — | — |
| Other Organic Acid | — | — | — | — | — | — |
| Total Organic Acids | 207 | 1.50 | 298 | 2.00 | 229 | 1.500 |
| Cellosolve | 135 | 1.50 | — | — | 180 | 2.000 |
| Mineral Spirits | 1,600 | — | 1,700 | — | 1,800 | — |
| Water | 200 | — | 150 | — | 200 | — |
| 35% Hydrazine | — | — | — | — | — | — |
| Eastazone | — | — | 4 | — | 4 | — |
| Triethanolamine | 15 | — | — | — | 15 | — |
| NH$_4$OH | 90 | — | 120 | — | 135 | — |
| Amyl Alc. Mix. Isom. | — | — | — | — | — | — |
| Potassium Iodide | — | — | — | — | — | — |
| Metal or Oxide | 665* | 11.30 | 600* | 10.20 | 765* | 13.000 |
| Air-Total Cu. Ft. | 36 | — | 80 | — | 94 | — |
| *Co powder | | | | | | |
| Product | | | | | | |

TABLE IV-continued

| Raw Material | Ex. C-9 Bt. | Moles | Ex. C-10 Bt. | Moles | Ex. C-11 Bt. | Moles |
|---|---|---|---|---|---|---|
| Metal % (Co) | 36.30 | | 35.90 | | 40.20 | |
| M/A Ratio-Moles | 5.49 | | 5.20 | | 3.20 | |
| Met. Conversion % | 36.50 | 51.00 | | 37.00 | | |
| Non-Volatile % | 76.96 | | 79.30 | | 86.60 | |
| Active Component | | | | | | |
| Metal % | 47.2% Co | | 45.2% Co | | 46.4% Co | |

TABLE IVa

| Raw Material | Ex. C-12 Bt. | Moles | Ex. C-13 Bt. | Moles | Ex. C-14 Bt. | Moles |
|---|---|---|---|---|---|---|
| 2-Ethylhexoic Acid | — | — | — | — | — | — |
| Neodecanoic Acid | 77 | 0.40 | 54 | 0.30 | 77 | 0.43 |
| Propionic Acid | — | — | — | — | — | — |
| Stearic Acid | 29 | 0.10 | 43 | 0.15 | 47 | 0.16 |
| Butyric Acid | 44 | 0.50 | 36 | 0.40 | 30 | 0.33 |
| Amyl Ac. Phosphate | — | — | 30 | 0.15 | 42 | 0.21 |
| Other Organic Acid | — | — | — | — | — | — |
| Total Organic Acids | 150 | 1.00 | 152 | 1.00 | 196 | 1.13 |
| Cellosolve | — | — | — | — | — | — |
| Mineral Spirits | 1,700 | — | 1,700 | — | 1,987 | — |
| Water | 150 | — | 200 | — | 221 | — |
| 35% Hydrazine | — | — | — | — | — | — |
| Eastazone | 35 | — | — | — | — | — |
| Triethanolamine | 25 | — | 25 | — | — | — |
| NH$_4$OH | 60 | — | 60 | — | 50 | — |
| Amyl Alc. Mix Isom. | 15 | — | 45 | — | 66 | — |
| Potassium Iodide | — | — | — | — | — | — |
| Metal or Oxide | 470* | 3.28 | 470* | 3.28 | 596 | 4.16 |
| Air-Total Cu. Ft. | 15 | — | 46 | — | — | — |
| *Cu$_2$O | | | | | | |
| Product | | | | | | |
| Metal % | 35.98 | | 36.30 | | 40.12 | |
| M/A Ratio-Moles | — | | 5.65 | | 5.59 | |
| Met. Conversion % | — | | — | | 76 | |
| Non-Volatile % | 62.70 | | 61.20 | | 69.5 | |
| Active Component | | | | | | |
| Metal % | 57.4% Cu | | 59.3% Cu | | 57.7% Cu | |

COBALT EXAMPLES (C9–C11)

With air introduction from the start, the mixture of Example C-9 having considerable excess cobalt metal powder, is heated to and held at about 70°–82° C. for 9½ hours under reflux, until a maximum soluble cobalt is reached. In addition to the water initially charged, and though water is formed in the reaction, further water is used to replace that carried off by the air and not condensed for reflux. Additions of mineral spirits can be made as needed to maintain fluidity.

The mixture then is dehydrated over 7 hours by slowly raising the temperature to about 154° C., and with nitrogen bubbled therethrough. The unreacted excess metal is filtered off, resulting in 2335g of a clear product solution containing 9.88% cobalt.

After distilling further solvent mineral spirits to a cobalt concentration of 36.33%, the final product is a clear, dark-brown mineral spirit solution of the complex.

The preparation of Example C-12, using the same three acids, is similarly carried out, with the primary difference in this example being omission of Cellosolve and of triethanolamine. Early in the dehydration stage, the batch changes from blue to greenish. The first and second stages run about 13½ hours each. A clear dark-brown final liquid product results upon concentration to 35.9% cobalt.

In Example C-11, only two acids are used, 2-ethylhexoic and stearic acids, and 283g of the cobalt reacts. The procedure again generally follows that used for C-9, and with 400g of the mineral spirits total being added in later periods of dehydration.

For the solid state, as in manganese compositions, ultimate particles comprise a cubic crystallite-core (here of CoO oxide type) encapsulated with some amorphous material, evidently metal hydroxyl carboxylate groupings with bound and unbound -OH. In carbon tetrachloride, freezing point depression indicates average molecular weights of about 500 ± 100. By gel permeation chromatography, molecular sizes are about 100 to 1,000Å and larger. In the solid, the particle core size is again on the order of about 50 to 100Å, with amorphous clusters of about 300–400Å.

COPPER EXAMPLES (C12–C14)

In the Example C-12 where the metal source is a stoichiometric amount of cuprous oxide, the three-acid batch again is heated to and held in the range of 71°–78° C. for 11 hours with continued introduction of air at reflux, plus further additions of water, though water is formed in the reaction beyond that charged in the batch. The batch is heated to and held at about 150° C. for 4 hours to remove water. Nitrogen is bubbled through the mixture. The product solution is filtered and concentrated to a brown final liquid product of 35.98% copper content with the listed final product properties, and a 57.4% copper content in the solid.

The four-acid batch of Example C-13 by a procedure similar to that of Example C-12, results in a final liquid product containing 36.3% copper, and 61.2% N.V. solids with 59.3% copper.

The copper complex of Example C-14 is prepared in a similar manner to C-13 as summarized in Table IVa.

In these copper complexes, the oxide core of CuO crystallite is triclinic with associated solubilizing amorphous organic material, especially of the metal hydroxyl carboxylate form. Freezing point depression in trichlorobenzene shows an average molecular weight of about 1,000 ± 100, and in carbon tetrachloride by gel permeation chromatography, molecule sizes of 100 to 1,000Å and larger. In the solid a uniform particle distribution appeared with a core size of about 50 to 100Å.

BIMETALLIC COMPLEXES (C15–C17)

Polymetallic complexes are also similarly producible utilizing at least two metal sources in the reaction batch as exemplified by the metal pairs manganese and zinc, manganese and barium, and manganese and cobalt, set forth in Examples C-15, C-16 and C-17 respectively (Table V).

and continued at somewhat lower temperatures until the mixture is clear. The final liquid is filtered.

The filtrate is similar to that of Example C15 in high metal content and M/A ratio. Atoms of barium as well as manganese are found in the core crystallite, again basically of a spinel structure.

In Example C17, the ingredients of the first column, comprising substantially all of the acids and the cobalt powder are charged into the reactor and air bubbling begun with heating to about 71° C. for 4 hours. Thereafter the ingredients of the second column are added, first the manganous oxide slurried in the Cellosolve and water, the hydrazine and as reheating progresses, the propionic acid. The heating is continued up to 97.5° C., until complete reaction of the oxide, and then dehydra-

TABLE V

| | BIMETALLIC COMPLEXES | | | | | | | |
|---|---|---|---|---|---|---|---|---|
| | Ex. C-15 | | Ex. C-16 | | Ex. C-17 | | | |
| Raw Material | Bt. | Moles | Bt. | Moles | Bt. | Moles | Bt. | Moles |
| 2-Ethylhexoic Acid | 43 | 0.30 | 43 | 0.30 | — | — | — | — |
| Neodecanoic Acid | 36 | 0.20 | 36 | 0.20 | 99 | 0.55 | — | — |
| Dodecyl Benzene Sulfonic Acid | 15 | 0.05 | 15 | 0.05 | — | — | — | — |
| Stearic Acid | 43 | 0.15 | 43 | 0.15 | 43 | 0.15 | — | — |
| Naphthenic Acid | 34 | 0.10 | 34 | 0.10 | — | — | — | — |
| Butyric Acid | 18 | 0.20 | 18 | 0.20 | — | — | — | — |
| Propionic Acid | — | — | — | — | 23 | 0.30 | 7.5 | 0.10 |
| Total Organic Acids | 189 | 1.00 | 189 | 1.00 | | | 172.5 | 1.10 |
| Cellosolve (*Acetate) | 54* | 0.40 | 54* | 0.40 | 20 | 0.22 | 90 | 1.00 |
| Mineral Spirits | 1,600 | | 1,600 | | 1,800 | | 100 | |
| Water | 240 | | 240 | | 400 | | 200 | |
| Hydrazine Hydrate | 8 | — | 8 | — | — | — | 5 | — |
| Zinc Oxide | 41 | 0.62 | | | | | | |
| Manganous Oxide | 606 | 8.50 | 624 | 8.75 | — | — | 515 | 7.27 |
| Barium Monohydrate | — | — | 50 | 0.25 | — | — | — | — |
| Co Metal Powder | — | — | — | — | 760 | — | — | — |
| Triethanolamine | — | — | — | — | 6 | — | — | — |
| NH$_4$OH | — | — | — | — | 60 | — | — | — |
| Air-Total Cubic Feet | 7 | — | 7 | — | 9 | — | 12.3 | — |
| Product | | | | | | | | |
| Mn % | 36.7 | | 38.3 | | 30.1 | | | |
| Other Metal % | 2.7 Zn | | 2.9 Ba | | 9.9 Co | | | |
| M/A Ratio (Molar) | 9.1 | | 9.0 | | 6.7 | | | |
| Mn Conversion % | 94.0 | | 94.1 | | | | | |
| Non-Volatile % | 67.8 | | 67.4 | | 69.1 | | | |
| Active Component | | | | | | | | |
| Metals % | 58.1 (Mn + Zn) | | 61.0 (Mn + Ba) | | 58.1 (Mn + Co) | | | |
| | 3.9 Zn | | 4.3 Ba | | 14.4 Co | | | |

For Example C-15, all the materials including zinc oxide are mixed, except the manganese oxide and hydrazine, and heated to about 72° C., when the latter two components are successively added. The mixture is heated up to 126° C. to complete the reaction of the manganese oxide. Air blowing is begun with simultaneous dewatering and concentration as mineral spirits and water are carried over. The mixture is subjected to the air blowing until clear and then filtered.

The filtrate has the indicated high total metal content of 39.4% and mole ratio of 9.1 for total metal to total acid with retained solubility. By diffraction and electron study as with prior examples, the dried products again exhibit the previously described oxide crystallite-core and matrix type structure in the ultimate solution-dispersed particles, with both metals present in the core which is essentially of the spinel structure.

In Example C-16, the batch ingredients and procedure are similar to C-15, except for the use of the barium oxide hydrate. All the barium hydroxide reacts quickly within a few minutes, and then the magnanous oxide and hydrazine are successively added and heating begun to obtain substantially complete oxide reaction even below 98° C. After some initial higher heating to 134° C. to begin dehydration, the air blowing is initiated tion at higher temperature occurs. The mixture is air blown until clear, with simultaneous further dehydration and concentration, and filtration.

The filtered product has the indicated high metal content of about 40.0% and 58.1% (43.7% Mn + 14.4% Co) in the solid. The M/A mole ratio is about 6.7.

As mentioned above, the elastomer additives of the invention contain mixed metal salts, and at least one metal is an oxidizing constituent and a second metal is a polymerizing constituent or calcium. These metals may be in the form of (a) an organic carboxylic acid salt of two different metals combined with one or more carboxylic acids, (b) a combination of two or more different metal salts of organic carboxylic acids, or (c) a combination of a metal salt of an organic carboxylic acid and a mixed organic acid salt complex.

An example of combination (b) is a combination of two or more of the basic carboxylate metal salts illustrated earlier as components S-1 through S-10. An example of such combination is cobalt naphthenate mixed with zirconium neodecanoate. The combination of metal salts (c) is prepared by mixing any one of the basic metal salts listed in Table I with any of the complex salts identified as C-1 through C-17 in Tables II through V.

The mixed metal salts used as elastomeric additives in accordance with the method of the invention may be prepared containing various amounts of the two required metal constituents and are preferably prepared as dispersions or solutions in rubber processing oils. Accordingly, the salt complexes described above in Tables II through V as dispersions in other diluents such as mineral spirits are treated to remove such diluents which are replaced by the desired amount of processing oil. Therefore, in the following examples, the complexes (C-1 through C-17) are identical to the correspondingly identified compounds of Tables II through V except that the diluent is a rubber processing oil, namely, "Flexon 641" available from Exxon Corporation.

Examples of elastomeric additives of this invention are given below in Table VI. Examples A through E and G through J are prepared by mixing the indicated components in the weight ratio of 1:1 although other weight ratios can be utilized. Examples F and K illustrate the use of an inorganic carboxylic acid salt containing two different metals of the type disclosed and claimed in U.S. Pat. No. 3,419,587.

TABLE VI

| Example | Component(s) | Elastomer Additives Total Metal Content |
|---------|--------------|------------------------------------------|
| A | S-1 + S-3 (1:1) | 8% Co; 9% Zr |
| B | S-1 + S-4 (1:1) | 8% Co; 3% Ce |
| C | S-1 + S-5 (1:1) | 8% Co; 15% Pb |
| D | S-2 + S-3 (1:1) | 6% Co; 9% Zr |
| E | S-1 + S-6 (1:1) | 8% Co; 3% Ca |
| F | Manchem CZ69* | 6% Co; 9% Zr |
| G | S-1 + C-14 (1:1) | 8% Co; 15% Cu |
| H | S-3 + C-14 (1:1) | 9% Zr; 15% Cu |
| I | S-1 + C-6 (1:1) | 8% Co; 20% Mn |
| J | S-2 + C-15 (1:1) | 6% Co; 17.8% Mn; 1.4% Zr |
| K | $CoZrV_{2-1/6}$** | 6% Co; 9.1% Zr |

*Commercial product available from Hardman & Holden Ltd., Manchester, England which is a cobalt and zirconium salt of one or more acids. U.S. 3,419,587.
**Product of Example 3 of U.S. Pat. No. 3,419,587

The amount of additive composition incorporated into the vulcanizable elastomeric compositions is an amount which is effective to improve the adhesion of the elastomer to metal. Generally, the amount of additive incorporated into the elastomer will be sufficient to provide about 0.001 to about 0.01 lb. mole of metal per 100 lbs. of elastomer.

Vulcanizable elastomers employed in this invention are any of the highly unsaturated elastomers which may be natural (Hevea) rubber which is essentially a polymer of isoprene, or conjugated diolefin polymer synthetic rubbers or mixtures of any of these including reclaimed rubber. Such conjugated diolefin polymer synthetic rubbers include homopolymers of 1,3-butadienes such as 1,3-butadiene, isoprene, 2,3-dimethyl-1,3-butadiene, copolymers of mixtures thereof, and copolymers of mixtures of one or more of such butadienes with up to about 75% by weight of one or more monoethylenic compounds which contain a $CH_2=C=$ group where in at least one of the unconnected valences is attached to an electronegative group. Examples of such compounds which contain a $CH_2=C=$ group and which are copolymerizable with 1,3-butadiene are aryl olefins such as styrene, vinyl toluene, alpha-methyl styrene, chlorostyrene, dichlorostyrene and vinyl naphthalene; the alpha methylene carboxylic acids and their esters, nitriles and amides such as acrylic acid, methyl acrylate, ethyl acrylate, methyl methacrylate, acrylonitrile, methacrylamide; vinylpyridines such as 2-vinylpyridine, 2-methyl-5-vinylpyridine; methyl vinyl ketone and methyl isopropenyl ketone. Typical examples of such rubbers include natural rubber (NR), butadiene-styrene rubber copolymers (SBR), butadiene-acrylonitrile rubbery copolymers (NBR) and the rubbery terpolymer of ethylene, propylene and a copolymerizable nonconjugated diene such as hexadiene, dicyclopentadiene, etc. (EPDM). The rubbers may be solution prepared or emulsion prepared, or otherwise.

The elastomeric stock also will contain conventional compounding and vulcanizing ingredients such as carbon black, silica, rubber processing or softening oils, antioxidants, sulfur, zinc oxide and accelerators.

The metal salt additive compositions of the invention such as those described in Table VI can be incorporated into at least a portion of the vulcanizable elastomeric stock along with the other compounding and vulcanizing ingredients appropriate to the particular rubber article being manufactured. Generally, a masterbatch formulation is prepared on a mill and the metal salt additive of the invention is mixed with the masterbatch in the desired proportions. The following examples illustrate the preparation of elastomer compounds in accordance with the method of the invention. The following masterbatch formulation is used in the elastomer examples E-1 through E-9.

| Masterbatch | Parts by Weight |
|-------------|-----------------|
| NR | 100.0 |
| GPF Black | 65.0 |
| Zinc Oxide | 5.0 |
| Stearic Acid | 1.0 |
| Diphenyl-p-phenylene diamine | 2.0 |
| Hydrocarbon resin | 5.0 |
| Santocure NS | 1.5 |
| Sulphur 80%/Stearic Acid 20% | 6.5 |
| Total | 186 |

Ninety-three lbs. of this masterbatch is mixed on a 60 inch mill at approximately 70° C. The total time to mix is about 45 to 50 minutes.

For the purpose of the following examples and testing, the elastomeric compositions are prepared to contain 0.0075 lb/moles of metal per 100 lbs. of rubber, and the compounding is effected on a size B laboratory Banbury mill. The amounts (in parts per 100 of rubber) of the metal additives incorporated into the elastomer compound in examples E-1 through E-9 is summarized in Table VII.

TABLE VII

| Elastomer Compound | Elastomer Additive Example | Amount (phr) |
|--------------------|----------------------------|--------------|
| E-1 | A | 3.25 |
| E-2 | B | 4.75 |
| E-3 | C | 3.75 |
| E-4 | D | 3.75 |
| E-5 | E | 3.50 |
| E-6 | F | 3.75 |
| E-7 | G | 2.0 |
| E-8 | H | 2.25 |
| E-9 | I | 1.5 |

The elastomeric compounds containing the mixed metal salt additives of the invention are laminated or coated (for example, by calendaring, extrusion, etc.) onto a metal reinforcement which frequently is in the form of a wire such as a wire type fabric which is used as breaker, belt or carcass plies including radial plies or tire bead wire. While brass plated steel wire is a wire commonly used in many applications, the invention is applicable to other metals such as unplated steel wire, nickel and chromium. Other reinforcing elements surfaced with metals or alloys of metals include lead, zinc, tin, etc.

The resulting assembly or laminate is fabricated or shaped and cured as in conventional practice appropriate to the specific article being manufactured. The adhesive bond between the elastomer and the metal is developed at elevated temperature during the curing or vulcanizing step.

The following examples demonstrate the metal reinforced laminates of the invention. The reinforcement is steel cord I.D.: Beakert 00131 EYWB-33, 7X4X0.15 which is a construction commonly encountered in the making of the plies of a tire.

invention are incorporated into the elastomer. For example, referring to Table VIII, the adhesion observed for elastomer composition E-1 which is a combination of salts S-1 and S-2 containing 8% cobalt and 9% zirconium is 90 PPI whereas the same masterbatch formulation containing 16% cobalt produces an adhesion of 81 PPI as does a similar elastomer composition containing 18% zirconium as salt S-3. The results reported in Table VIII show the improvement in adhesion made possible by the invention particularly as evidenced by the increased pull necessary to separate the wire from the rubber in the cured laminate as measured in pounds per inch.

TABLE VIII

ELASTOMER TO METAL BONDING

| Elastomer | | Cure Time (Minutes) | Cord Coverage | Adhesion (PPI) | Scorch Time (Minutes) | Optimum Cure Torque |
|---|---|---|---|---|---|---|
| E-1 | (S-1 + S-3) | 15 | 3 | 90 | 5.2 | 46.6 |
| | (S-1) | 14 | 3 | 81 | 5.8 | 43.9 |
| | (S-3) | 19 | 4 | 81 | 6.6 | 44.9 |
| E-2 | (S-1 + S-4) | 14 | 4 | 89 | 4.4 | 46.7 |
| | (S-1) | 14 | 3 | 81 | 5.8 | 43.9 |
| | (S-4) | 19 | 2 | 47 | 6.6 | 36.8 |
| E-3 | (S-1 + S-5) | 12 | 4 | 123 | 3.4 | 48.4 |
| | (S-1) | 14 | 3 | 81 | 5.8 | 43.9 |
| | (S-5) | 13 | 0 | 53 | 8.6 | 49.1 |
| E-4 | (S-2 + S-3) | 14 | 2 | 94 | 4.5 | 49.6 |
| | (S-3) | 19 | 4 | 81 | 6.6 | 44.9 |
| E-5 | (S-1 + S-6) | 13 | 1-2 | 74 | 5.1 | 44.1 |
| | (S-1) | 14 | 3 | 81 | 5.8 | 43.9 |
| | (S-6) | 12 | 0 | 53 | 4.3 | 41.5 |
| E-6 | (Manchem CZ69) | 14 | 3 | 115 | 4.2 | 52.6 |
| E-7 | (S-1 + C-14) | 15 | 3 | 99 | 4.4 | 50.0 |
| | (S-1) | 14 | 3 | 81 | 5.8 | 43.9 |
| | (C-14) | 19 | 5 | 121 | 6.1 | 47.6 |
| E-8 | (S-3 + C-14) | 20 | 3 | 111 | 5.0 | 49.7 |
| | (S-3) | 19 | 4 | 81 | 6.6 | 44.9 |
| | (C-14) | 19 | 5 | 121 | 6.1 | 47.6 |
| E-9 | (S-1 + C-6) | 12 | 1 | 87 | 4.0 | 49.9 |
| | (S-1) | 14 | 3 | 81 | 5.8 | 43.9 |

The elastomer compounds described in Table VII are formed into adhesion test specimens using the above-described wire and cured at about 150° C. (300° F.) for a period of time as indicated in the following Table VIII. The test specimens are subjected to the following adhesion tests to determine the strength of the bond between the vulcanized rubber and the wire. The adhesion tests are conducted in accordance with ASTM Test No. D-2229 using a crosshead speed of 2 inches/min. In this test, the force required in pounds to remove a 2-inch piece of the steel wire embedded in the vulcanized rubber block is measured (Instron) and recorded in pounds per inch (PPI). The results of this test (as an average of seven cords) are shown in Table VIII.

Another criterion for determining the effectiveness of the bond between the vulcanized elastomer and the metal is a visual estimation of the amount of rubber stock left on the wire after it is pulled from the vulcanized rubber block in the manner described above. The amount of rubber remaining on the wire is rated on a scale of from 0 to 10, 0 representing no remaining rubber and 10 representing complete coverage of the wire. The results of these tests on vulcanized elastomer compounds E-1 through E-9 also are summarized in Table VIII.

In addition to the results of the above tests, Table VIII also contains an indication of the scorch time (minutes) and optimum cure torque of the elastomer samples of the invention as determined by ASTM test designation D-2084. When available, the test results on elastomer compositions containing a single metal salts are included in Table VIII to illustrate the superior results obtained when the mixed metal salt additives of the The embodiment of the invention in which an exclusive property or privilege is claimed is defined as follows:

1. A vulcanizable elastomeric composition comprising an elastomer and from about 0.001 to 0.01 pound mole of metal per 100 pounds of elastomer, the metal content comprising at least one metal which is an oxidizing constituent and a second metal which is a polymerizing constituent or calcium, said metals being present as either
    (a) an organic carboxylic acid salt of two different metals combined with one or more carboxylic acids, or
    (b) a combination of two or more different metal salts of organic carboxylic acids, or
    (c) a combination of a metal salt of an organic carboxylic acid and a mixed organic acid salt complex.

2. The composition of claim 1 wherein the first metal is selected from the group consisting of cobalt, copper, manganese or the rare earths.

3. The composition of claim 1 wherein the second metal is selected from the group consisting of lead, zirconium, manganese, copper, the rare earths and calcium.

4. The composition of claim 1 wherein the first metal is cobalt.

5. The composition of claim 1 wherein the metal is present as a combination of two or more different metal salts or organic carboxylic acids.

6. The composition of claim 5 wherein the organic carboxylic acids are aliphatic or alicyclic monocarboxylic acids having six to 20 carbon atoms.

7. The composition of claim 1 wherein the mixed organic acid salt complex comprises an overbased salt complex of a mixture of organic carboxylic acids or a mixture of organic monocarboxylic and sulfonic acids.

8. The composition of claim 7 wherein the mixed organic salt complex comprises a metal oxide and hydroxide-carboxylate complex wherein the metal content comprises at least one transitional metal which is in chemical combination partly in a nuclear oxide or hydroxide crystallite core and partly with at least two different organic acid ligand moieties derived from monosulfonic acids and monocarboxylic acids containing more than two carbon atoms, at least one of the acid ligands being derived from a monocarboxylic acid containing at least seven carbon atoms, and when the second ligand also is a monocarboxylic acid, the second ligand contains a number of carbon atoms in its longest chain differing by at least two carbon atoms from the total number of carbon atoms in the other, the ratio of total metal moles to total moles of organic acid being greater than one.

9. The composition of claim 8 wherein the salt complex is represented by the formula $$[(ML_a)_b (HO-M-R_1)_c (HO-M-R_2)_d]_f$$

wherein
M is a metal atom with valence greater than one, is a transitional metal in the majority of metal occurrences in the composition, and each M may represent different metals:
L is an oxygen or a hydroxyl group;
$R_1$ is an organic monocarboxylate group;
$R_2$ is an organic monocarboxylate or monosulfonic group;
$a$ is from about 1 to 2;
$b$ is greater than 1;
$c$ and $d$ are each greater than zero, and $c + d$ is at least 3; and
$f$ is at least 1.

10. A method of improving the adhesion between a vulcanizable elastomeric composition and a brass coated metal surface to provide a strong and durable bond comprising the steps of
(a) providing an elastomeric vulcanizable composition containing from about 0.001 to about 0.01 pound moles of metal per 100 pounds of elastomer, the metal content comprising at least one first metal which is an oxidizing constituent and a second metal which is a polymerizing constituent or calcium, said metals being present as either
(i) an organic carboxylic acid salt of two different metals combined with one or more carboxylic acids, or
(ii) a combination of two or more different metal salts of organic carboxylic acids, or
(iii) a combination of a metal salt of an organic carboxylic acid and a mixed organic acid salt complex;
(b) contacting the elastomeric composition prepared in step (a) with a brass coated metal surface, and
(c) vulcanizing the elastomeric composition while in contact with the metal.

11. The method of claim 10 wherein the first metal is selected from the group consisting of cobalt, copper, manganese or the rare earths.

12. The method of claim 10 wherein the second metal is selected from the group consisting of lead, zirconium, manganese, copper, the rare earths and calcium.

13. The method of claim 11 wherein the first metal is cobalt.

14. The method of claim 10 wherein the metal is present as a combination of two or more different metal salts of organic carboxylic acids.

15. The method of claim 14 wherein the organic carboxylic acids are aliphatic or alicyclic monocarboxylic acids having from six to 20 carbon atoms.

16. The method of claim 10 wherein the mixed organic acid salt complex comprises an overbased salt complex of a mixture of organic carboxylic acids or a mixture of organic monocarboxylic and sulfonic acids.

17. The method of claim 16 wherein the mixed organic salt complex comprises a metal oxide and hydroxide-carboxylate complex wherein the metal content comprises at least one transitional metal which is in chemical combination partly in a nuclear oxide or hydroxide crystallite core and partly with at least two different organic acid ligand moieties derived from monosulfonic acids and monocarboxylic acids containing more than two carbon atoms, at least one of the acid ligands being derived from a monocarboxylic acid containing at least seven carbon atoms, and when the second ligand also is a monocarboxylic acid, the second ligand contains a number of carbon atoms in its longest chain differing by at least two carbon atoms from the total number of carbon atoms in the other, the ratio of total metal moles to total moles of organic acid being greater than one.

18. The method of claim 17 wherein the slat complex is represented by the formula $$[(ML_a)_b (HO-M-R_1)_c (HO-M-R_2)_d]_f$$

wherein
M is a metal atom with valence greater than one, is a transitional metal in the majority of metal occurrences in the composition, and each M may represent different metals;
L is an oxygen or a hydroxyl group;
$R_1$ is an organic monocarboxylate group;
$R_2$ is an organic monocarboxylate or monosulfonate group;
$a$ is from about 1 to 2;
$b$ is greater than 1;
$c$ and $d$ are each greater than zero, and $c + d$ is at least 3; and
$f$ is at least 1.

19. The method of claim 10 wherein the elastomeric composition provided in step (a) contains a combination of a metal carboxylate salt and an overbased mixed organic acid salt complex.

20. A laminate of a reinforcing element having a brass coated metal surface and a vulcanized elastomer composition containing from about 0.001 to about 0.01 pound mole of metal per 100 pounds of elastomer, the metal content comprising at least one metal which is an oxidizing constituent and a second metal which is a polymerizing constituent or calcium, said metals being present as either (a) an organic carboxylic acid salt of two different metals combined with one or more carboxylic acids, or
(b) a combination of two or more different metal salts of organic carboxylic acids, or
(c) a combination of a metal salt of an organic carboxylic acid and a mixed organic acid salt complex.

21. The laminate of claim 20 wherein the reinforcing element is brass coated wire tire cord.

22. The laminate of claim 20 wherein the first metal is cobalt, copper, manganese or the rare earths.

23. The laminate of claim 20 wherein the second metal is lead, zirconium, manganese, copper, one or more of the rare earths, or calcium.

24. The laminate of claim 20 wherein the first metal is cobalt.

25. The laminate of claim 20 wherein the metal is present as a combination of two or more different metal salts of organic carboxylic acids.

26. The laminate of claim 25 wherein the organic carboxylic acids are aliphatic or alicyclic monocarboxylic acids having from six to 20 carbon atoms.

27. The laminate of claim 20 wherein the mixed organic acid salt complex comprises an overbased salt complex of a mixture of organic carboxylic acids or a mixture of organic monocarboxylic and sulfonic acids.

28. The laminate of claim 27 wherein the mixed organic salt complex comprises a metal oxide and hydroxide-carboxylate complex wherein the metal content comprises at least one transitional metal which is in chemical combination partly in a nuclear oxide or hydroxide crystallite core and partly with at least two different organic acid ligand moieties derived from monosulfonic acids and monocarboxylic acids containing more than two carbon atoms, at least one of the acid ligands being derived from a monocarboxylic acid containing at least seven carbon atoms, and when the second ligand also is a monocarboxylic acid, the second ligand contains a number of carbon atoms in its longest chain differing by at least two carbon atoms from the total number of carbon atoms in the other, the ratio of total metal moles to total metal moles to total moles of organic acid being greater than one.

29. The laminate of claim 28 wherein the salt complex is represented by the formula

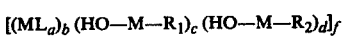

wherein
M is a metal atom with valence greater than one, is a transitional metal in the majority of metal occurrences in the composition, and each M may represent different metals:
L is an oxygen or a hydroxyl group;
$R_1$ is an organic monocarboxylate group;
$R_2$ is an organic monocarboxylate or monosulfonic group;
$a$ is from about 1 to 2;
$b$ is greater than 1;
$c$ and $d$ are each greater than zero, and $c + d$ is at least 3; and
$f$ is at least 1.

* * * * *